United States Patent [19]

Neil et al.

[11] Patent Number: 4,840,345
[45] Date of Patent: Jun. 20, 1989

[54] CLIPS WITH OVERLAPPING ENGAGEMENT MEMBERS

[75] Inventors: Gary A. Neil, Amersham; Edward H. F. Ferguson, Aylesbury, both of England

[73] Assignee: TRW United-Carr Ltd., Buckinghamshire, United Kingdom

[21] Appl. No.: 149,696

[22] Filed: Jan. 29, 1988

[30] Foreign Application Priority Data

Jan. 30, 1987 [GB] United Kingdom ................. 8702148

[51] Int. Cl.$^4$ ................................................. F16L 3/08
[52] U.S. Cl. .............................. 248/74.2; 24/16 PB; 24/458; 24/487; 248/71
[58] Field of Search ............. 248/74.2, 74.3, 74.4, 248/74.5, 74.1, 71, 73, 67.7, 68, 316.7; 24/458, 487, 16 PB, 17 A, 17 AP

[56] References Cited

U.S. PATENT DOCUMENTS

| | | | |
|---|---|---|---|
| 3,913,187 | 10/1975 | Okuda | 24/16 PB X |
| 4,183,120 | 1/1980 | Thorne | 24/16 R |
| 4,214,351 | 7/1980 | Wenk | 24/16 PB |
| 4,557,024 | 12/1985 | Roberts et al. | 24/16 R X |
| 4,564,163 | 1/1986 | Barnett | 248/74.3 X |
| 4,623,102 | 11/1986 | Hough, Jr. | 248/74.3 X |
| 4,637,097 | 1/1987 | Secord | 24/487 X |
| 4,663,807 | 5/1987 | Bozzo | 24/16 PB X |
| 4,669,688 | 6/1987 | Itoh et al. | 248/74.2 |

FOREIGN PATENT DOCUMENTS

| | | | |
|---|---|---|---|
| 0069223 | 1/1983 | European Pat. Off. | 24/487 |
| 2142376 | 1/1985 | United Kingdom | 248/74.2 |

Primary Examiner—Ramon O. Ramirez
Attorney, Agent, or Firm—Fay, Sharpe, Beall, Fagan, Minnich & McKee

[57] ABSTRACT

A clip 10 for an electrical wiring harness of a vehicle comprises a gapped annular body 12, the end portions of which are adapted to interengage in overlapped relationship to close the body. The end portions are provided with abutment means 48,50; 52,56 and 58,60 which prevent transverse relative movement of the end portions when they are so interengaged. In this way the risk of disengagement of the end portions is avoided.

11 Claims, 1 Drawing Sheet

CLIPS WITH OVERLAPPING ENGAGEMENT MEMBERS

This invention relates to clips, and more particularly to clips for clipping together a plurality of elongate members or clipping at least one such member to a surface.

Such clips comprising a gapped annular body, the end portions of which are adapted to interengage to close the body are known. For example, U.S. Pat. No. 3,913,187 discloses such a clip wherein the end portions are interengageable over a range of degrees of overlapped relationship to enable the body to tightly grip the elongate member or members disposed within the body.

A disadvantage with such clips is that the end portions may become transversely misaligned either during fitting or in service such that they do not interengage properly with a resultant risk that the clip body may inadvertently open.

According to the present invention there is provided a clip comprising a gapped annular body, the end portions of which are adapted to interengage in overlapped relationship to close the body, said end portions being provided with abutment means for preventing transverse relative movement of the end portions when they are so interengaged.

One of the end portions may be bifurcated such that the forks thereof overlap the other end portion inwardly and outwardly thereof when said end portions are interengaged, and in one embodiment of the invention, to be described hereinafter, said forks comprise first and second transverse portions of said one end portion, said first transverse portion being arranged to overlap a first transverse portion of the other end portion and the second transverse portion being arranged to be overlapped by a second transverse portion of the other end portion when said end portions are interengaged.

In such an arrangement, the clip may comprise first abutment means on said other end portion for engaging first abutment means on said first transverse portion of said one end portion for preventing transverse movement of said first transverse portion of said one end portion across the second transverse portion of said other end portion and second abutment means on said other end portion for engaging second abutment means on said second transverse portion of said one end portion for preventing transverse movement of said second transverse portion of said one end portion across the first transverse portion of said other end portion.

Advantageously, the first transverse portions of said end portions are provided with cooperable ramp teeth for interengaging said end portions over a range of degrees of overlapped relationship.

The ramp teeth may be spaced from the side edges of said first transverse portions remote from the second transverse portions, and said first abutment means on said other end portion may comprise ends of the ramp teeth thereon.

Additionally or alternatively, the first abutment means on said other end portion may comprise a side face of a projection on said other end portion, said first abutment means of said first transverse portion of said one end portion comprising a side edge thereof.

In such a case, preferably, the first portion of said one end portion has a chamfered free end, with which said projection is cooperable for guiding said first transverse portion of said one end portion into overlapping relationship with said first transverse portion of said other end portion.

The second abutment means on said other end portion may comprise a side face thereon, said second abutment means of said second transverse portion of said one end portion comprising a side edge thereof. This side face may comprise a side face of a recess in the other end portion for receiving the second transverse portion of said one end portion. Further, the second transverse portion of said one end portion may have a chamfered free end, with which said side face of said other end portion is cooperable for guiding said second transverse portion of said one end portion into overlapping relationship with said second transverse portion of said other end portion.

Advantageously, the gapped annular body of the clip may comprise an integral thermoplastics moulding. The integral body may comprise two body portions hinged together, and a mounting member may extend from one of the body portions and a hook member may be provided on the other of the body portions.

The invention also includes a clip comprising a gapped annular body, the end portions of which are adapted to interengage in overlapped relationship to close the body, wherein one of said end portions is bifurcated such that a first transverse portion is arranged to overlap a first transverse portion of the other end portion and second transverse portion is arranged to be overlapped by a second transverse portion of the other end portion when said end portions are interengaged.

In order that the invention may be well understood, an embodiment thereof, which is given by way of example only, will now be described, reference being made to the accompanying drawings, in which.

Figure 1:
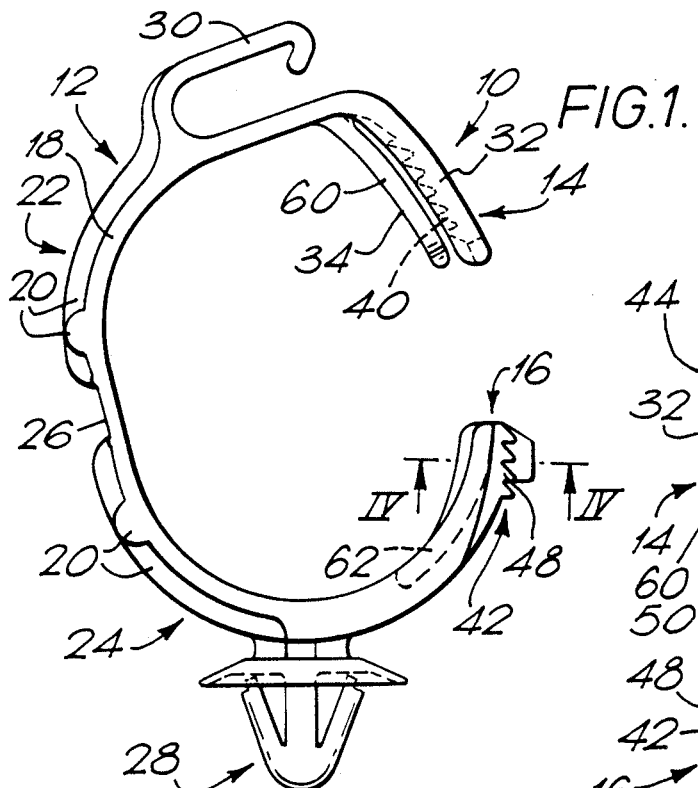
FIG. 1 is a side view of a clip for an electrical wiring harness of a vehicle comprising a gapped annular body, the end portions of which are adapted to interengage to close the body.
Figure 2:
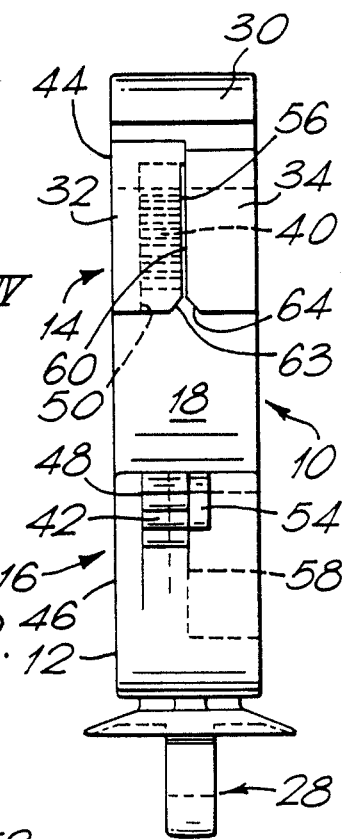
FIG. 2 is a front view of the clip.
Figure 3:
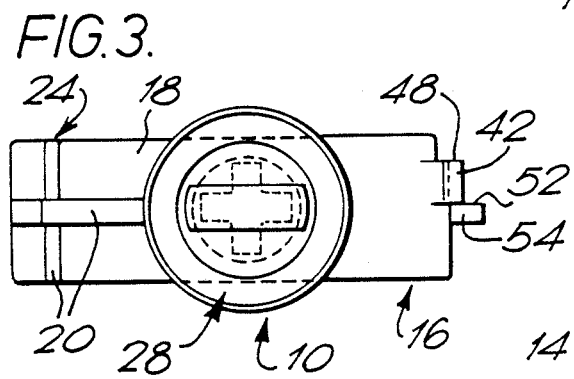
FIG. 3 is a plane view of the clip.
Figure 4:
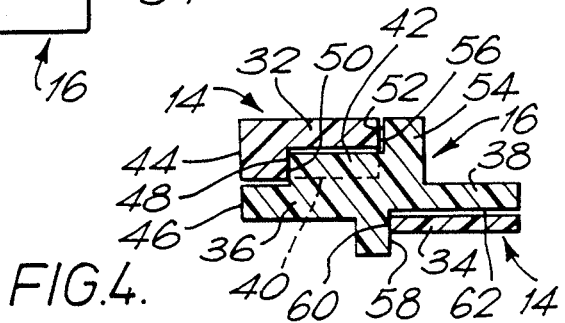
FIG. 4 is a cross-section through the two end portions when they are interengaged to close the body, the cross-section being taken along a line rotated through 90° from the line IV—IV in FIG. 1 and to a larger scale than FIG. 1.

Referring to the drawings, there is shown, a clip 10 for an electrical wiring harness of a vehicle, which clip is moulded integrally from a thermoplastics material such as acetal. The clip comprises a gapped annular body 12, the end portions 14 and 16 of which are adapted to interengage to close the body. FIG. 1 illustrates the body in an open condition and the interengagement of the end portions is illustrated in FIG. 4 which will be described in more detail hereinafter. The body is moulded in the illustrated open condition both to facilitate moulding and to ease assembly of the harness into the clip. The resilience of the body permits the end portions to be brought into interengagement from the open condition, and in the illustrated embodiment this is assisted by forming the body of a wall 18 which is reinforced with external ribbing 20 over two portions 22,24 of the body which portions are interconnected by an unreinforced section 26 of the wall 18 which serves as a hinge between the two body portions 22,24. Additionally the second 26 of the wall 18 could be reduced in thickness.

A mounting member 28 extends from the body portion 24 to enable the clip to be snap-fitted into an aperture in a vehicle panel in a manner known per se. A hook member 30 is provided on the body portion 22 so that the clip may retain one or more other elongate members in addition to the electrical wiring harness.

The end portions 14,16 of the body are adapted to interengage in overlapped relationship. To this end, in the embodiment, one of the end portions 14 is bifurcated such that the forks 32,34 thereof overlap the other end portion 16 inwardly and outwardly thereof when the end portions are interengaged. As best shown in FIG. 4, the forks 32,34 comprise first and second axially offset transverse portions of the end portion 14, the first transverse portion 32 being arranged to radially overlap a first transverse portion 36 of the end portion 16 and the second transverse portion 34 being arranged to be radially overlapped by a second transverse portion 38 of the end portion when the end portions are interengaged.

The end portions 14 and 16 are provided with abutment means for preventing transverse relative movement of the end portions when they are interengaged in overlapped relationship. Broadly stated, in the embodiment these abutment means comprise first abutment means on end portion 16 for engaging first abutment means on the transverse portion 32 of end portion 14 for preventing transverse movement of portion 32 across transverse portion 34 of end portion 14, and second abutment means on end portion 16 for engaging second abutment means on the transverse portion 34 of end portion 14 for preventing transverse movement of portion 34 across portion 32.

In the embodiment, where the transverse portions 32,36 of the end portions are provided with cooperable ramp teeth 40,42 for interengaging the end portions over a range of overlapped relationships and the ramp teeth are spaced from the side edges 44,46 of the portions 32,36 remote from the portions 34,38, the first abutment means on the end portion 16 referred to above comprise the ends 48 of the ramp teeth thereon which abut against a wall 50 on the portion 32 adjacent the corresponding ends of the ramp teeth 40 thereon. Alternatively or, as illustrated, additionally, the first abutment means on the end portion 16 comprises a side face 52 of a projection 54 thereon arranged for engaging a side edge 56 of the portion 32 of end portion 14. As illustrated where both such arrangement are provided, whilst the teeth ends 48 and 50 are in abutting relationship, the side face 52 and side edge 56 are slightly spaced apart to facilitate interengagement of the end portions and to allow for manufacturing tolerances. However, it will be appreciated that the side face 52 would be engaged by the side edge 56 of portions 14 to prevent the portion 14 moving across portion 38 if the abutment between teeth ends 48 and wall 50 is lost.

In the embodiment, the second abutment means on the end portion 16 referred to above comprises a side face 58 thereon which abuts against a side edge 60 of the transverse portion 34 of end portion 14. This side face 58 comprises a side face of a recess 62 in the end portion 16 for receiving the portion 34 of end portion 14.

The free end of transverse end portion 32 of end portion 14 is chamfered as shown at 63 to cooperate with the projection 54 when the end portions 14,16 are being interengaged such that the projection can guide the portion 32 into overlapping relationship with the transverse portion 36 of end portion 16. Similarly, the free end of transverse end portion 34 is chamfered as shown at 64 to cooperate with side face 58 when the end portions 14,16 are being interengaged such that the side face 58 can guide the portion 34 into overlapping relationship with the transverse end portion of end portion 16. In this way, closure of the body is greatly facilitated since proper alignment of the end portions in their overlapping relationship is ensured. This is particularly useful where the body has to be closed blind—i.e. where the fitter cannot see the clip—since the body has to be closed with some force to achieve a degree of overlapping relationship of the two end portions which will result in the wiring harness being tightly gripped by the closed body.

It will be appreciated that both during closure of the body and subsequently in service transverse misalignment of the end portions 14,16 and the consequent risk of their disengagement is prevented by the provision of the cooperable abutment means 48,50; 52,56 and 58,60 described above.

We claim:

1. A clip comprising a gapped annular body having two end portions defining a gap therebetween, said end portions being adapted to interengage in overlapped relationship to close the body, one of said end portions being bifurcated to provide a forked configuration defining first and second radially spaced and axially offset fork portions and the other end comprising first and second axially adjacent parts, said fork portions being arranged such that, when said end portions are interengaged, said first fork portion radially overlaps substantially only said first part and said second fork portion is radially overlapped by substantially only said second part; and, abutment means extending radially from between said axially adjacent parts to engage axially between said first and second fork portions.

2. A clip as claimed in claim 1, wherein said first portion and said first part of said end portions are provided with cooperable ramp teeth for interengaging said end portions over a range of degrees of overlapped relationship.

3. A clip as claimed in claim 1, wherein said gapped annular body comprises an integral thermoplastics moulding.

4. A clip as claimed in claim 3, wherein said body comprises two body portions hinged together.

5. A clip as claimed in claim 4, wherein a mounting member extends from one of said body portions.

6. A clip as claimed in claim 5, wherein a hook member is provided on the other of said body portions.

7. A clip comprising a gapped annular body having two end portions defining a gap therebetween said end portions being adapted to interengage to close the body, one of said end portions being bifurcated so as to define first and second fork portions and the other end comprising first and second transversely adjacent parts, said fork portions being arranged such that, when said end portions are interengaged, said first fork portion overlaps substantially only said first part and said second fork portion is overlapped by substantially only said second part, first abutment means on said other end portion for engaging first abutment means on said first fork portion for preventing transverse movement of said first fork portion across the second part of said other end portion and second abutment means on said other end portion for engaging second abutment means on said second fork portion for preventing transverse movement of said second fork portion across the first part of said other end portion, said first portion and said first part of said end portions being provided with cooperable ramp teeth for interengaging said end portions over a range of degrees of overlapped relationship, said ramp teeth being spaced from the side edges of said first fork portion and said first part remote from the second fork portion and the second part, and said first abutment means on said other end portion comprising ends of the ramp teeth thereon.

8. A clip as claimed in claim 7, wherein said first abutment means on said other end portion comprises a side face of a projection on said other end portion, said first abutment means of said first fork portion of said one end portion comprising a side edge thereof.

9. A clip comprising a gapped annular body having two end portions defining a gap therebetween, said end portions being adapted to interengage to close the body, one of said end portions being bifurcated so as to define first and second fork portions and the other end comprising first and second transversely adjacent parts, said fork portions being arranged such that, when said end portions are interengaged, said first fork portion overlaps substantially one said first part and said second fork portion is overlapped by substantially only said second part, first abutment means on said other end portion for engaging first abutment means on said first fork portion for preventing transverse movement of said first fork portion across the second part of said other end portion and second abutment means on said other end portion for engaging second abutment means on said second fork portion for preventing transverse movement of said fork portion across the first part of said other end portion, said first abutment means on said other end portion comprising a side face of a projection on said other end portion said first abutment means of said first fork portion of said one end portion comprising a side edge thereof, the first fork portion of said one end portion having a chamfered free end with which said projection is cooperable for guiding said first fork portion of said one end portion into overlapping relationship with said first part of said other end portion.

10. A clip comprising a gapped annular body having two end portions defining a gap therebetween, said end portions being adapted to interengage to close the body, one of said end portions being bifurcated so as to define first and second fork portions and the other end comprising first and second transversely adjacent parts, said fork portions being arranged such that, when said end portions are interengaged, said first fork portion overlaps substantially only said first part and said second fork portion is overlapped by substantially only said second part, first abutment means on said other end portion for engaging first abutment means on said first fork portion for preventing transverse movement of said first fork portion across the second part of said other end portion and second abutment means on said other end portion for engaging said abutment means on said second fork portion for preventing transverse movement of said fork portion across the first part of said other end portion, said second abutment means on said other end portion comprising a side face thereon, said second abutment means of said second fork portion of said one end portion comprising a side edge thereof, said side face on said other end portion comprising a side face of a recess therein for receiving the second fork portion of said one end portion.

11. A clip as claimed in claim 10, wherein said second fork portion of said one end portion has a chamfered free end, with which said side face of said other end portion is cooperable for guiding said second fork portion of said one end portion into overlapping relationship with said second part of said other end portion.

* * * * *

UNITED STATES PATENT AND TRADEMARK OFFICE
CERTIFICATE OF CORRECTION

PATENT NO. : 4,840,345

DATED : June 20, 1989

INVENTOR(S) : Gary A. Neil, et al.

It is certified that error appears in the above-identified patent and that said Letters Patent is hereby corrected as shown below:

Column 2, line 44, delete "plane" and insert --plan--.

Column 3, line 5, underline "per se".

Column 3, line 42, insert --,-- between "thereon" and "which".

Claim 7, Column 4, line 53, insert --,-- between "therebetween" and "said".

Claim 9, Column 5, line 24, delete "one" and insert --only--.

Signed and Sealed this

Tenth Day of April, 1990

Attest:

HARRY F. MANBECK, JR.

*Attesting Officer*   *Commissioner of Patents and Trademarks*